(12) United States Patent
Helfer et al.

(10) Patent No.: US 10,012,954 B2
(45) Date of Patent: Jul. 3, 2018

(54) REDUCED DIMENSION BALANCE SPRING OF CONSTANT DOUBLE SECTION

(71) Applicant: ETA SA Manufacture Horlogere Suisse, Grenchen (CH)

(72) Inventors: Jean-Luc Helfer, Le Landeron (CH); Yves-Alain Cosandier, Renens (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 15/446,596

(22) Filed: Mar. 1, 2017

(65) Prior Publication Data

US 2017/0255163 A1   Sep. 7, 2017

(30) Foreign Application Priority Data

Mar. 4, 2016   (EP) ..................................... 16158809

(51) Int. Cl.
*G04B 17/06* (2006.01)
*F16F 1/04* (2006.01)
*G04B 17/34* (2006.01)

(52) U.S. Cl.
CPC ............ *G04B 17/063* (2013.01); *F16F 1/042* (2013.01); *F16F 1/047* (2013.01); *G04B 17/066* (2013.01); *G04B 17/345* (2013.01)

(58) Field of Classification Search
CPC .... G04B 17/063; G04B 17/06; G04B 17/066; F16F 1/047; F16F 1/042
See application file for complete search history.

(56) References Cited

U.S. PATENT DOCUMENTS

| 209,642 | A | * | 11/1878 | Morgan | G04B 17/066 368/175 |
| 3,528,237 | A | * | 9/1970 | Suard | G04B 17/066 368/127 |
| 7,682,068 | B2 | * | 3/2010 | Bourgeois | G04B 17/066 368/169 |
| 8,002,460 | B2 | * | 8/2011 | Daout | G04B 17/20 368/175 |
| 8,348,497 | B2 | * | 1/2013 | Daout | G04B 17/20 368/175 |
| 2006/0055097 | A1 | | 3/2006 | Conus et al. | |
| 2011/0069591 | A1 | | 3/2011 | Daout | |
| 2015/0277382 | A1 | | 10/2015 | Conus et al. | |

FOREIGN PATENT DOCUMENTS

| CH | 706 087 A1 | 8/2013 |
| EP | 1 445 670 A1 | 8/2004 |
| EP | 2 299 336 A2 | 3/2011 |

OTHER PUBLICATIONS

European Search Report dated Sep. 6, 2016 in European Application 16158809.0 filed on Mar. 4, 2016 (with English Translation of Categories of Cited Documents).

* cited by examiner

*Primary Examiner* — Sean Kayes
(74) *Attorney, Agent, or Firm* — Oblon, McClelland, Maier & Neustadt, L.L.P.

(57) ABSTRACT

A one-piece balance spring including a single strip wound on itself between an inner coil and an outer coil, the strip having a geometry such that when the angle of contraction of the balance spring has a value of 360 degrees, there is a substantially constant distance between each coil from the inner coil to the penultimate coil.

7 Claims, 4 Drawing Sheets

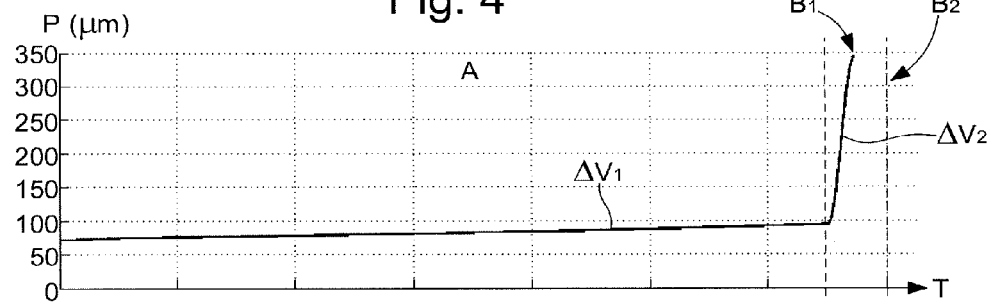
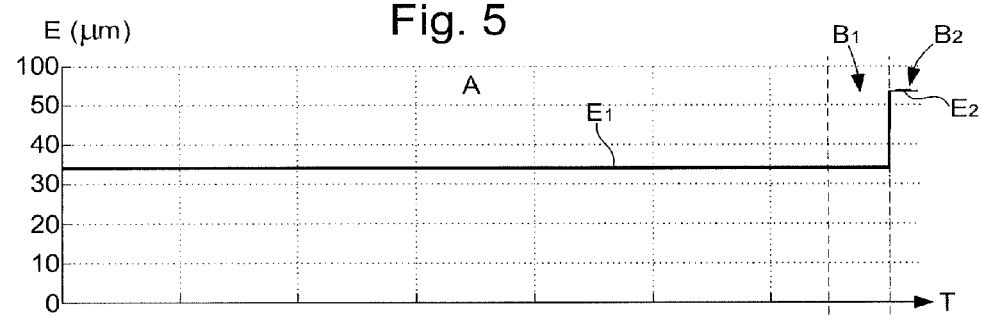
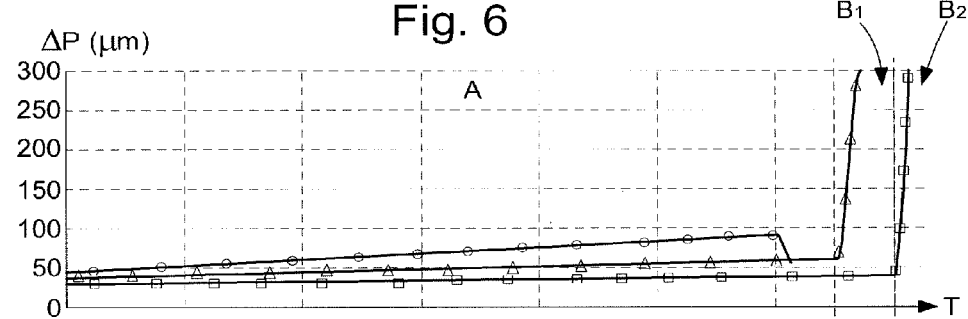

REDUCED DIMENSION BALANCE SPRING OF CONSTANT DOUBLE SECTION

This application claims priority from European Patent Application No. 16158809.0 filed on Mar. 4, 2016, the entire disclosure of which is hereby incorporated herein by reference.

FIELD OF THE INVENTION

The invention relates to a reduced dimension spring and, more particularly, such a spring intended to cooperate with a balance wheel to form a resonator.

BACKGROUND OF THE INVENTION

The cost of a silicon balance spring is substantially proportional to its surface area, i.e. the more balance springs can be etched on the same wafer, the lower the unit cost of the balance spring.

However, it is not possible to randomly decrease dimensions since the coils of a balance spring must not touch each other either in the contracted state or the expanded state.

SUMMARY OF THE INVENTION

It is an object of the present invention to overcome all of part of aforecited drawbacks by proposing a reduced dimension balance spring while ensuring that its coils do not touch each other either in the contracted state or the expanded state.

To this end, the invention relates to a one-piece balance spring comprising a single strip wound on itself between an inner coil and an outer coil, the strip at rest comprising, between the end of the inner coil and the penultimate coil, a first area in which the pitch between each coil increases continuously so that when the angle of contraction of the balance spring has a value of 360 degrees, there is a substantially constant distance between each coil from the inner coil to the penultimate coil.

Advantageously according to the invention, it is understood that the dimensions of the balance spring are reduced while ensuring a constant minimum distance between the coils in the contracted state and, possibly also in the expanded state. Therefore, one can attempt to minimise the size of the balance spring without losing timekeeping properties. With such a balance spring, it is possible to optimise the number of balance springs etched on the same wafer in order to reduce the unit cost.

In accordance with other advantageous variants of the invention:

in the first area, the pitch between each coil continuously increases by a constant value;
 the first area has a constant section;
 the balance spring includes a second area, in the extension of the first area and comprised between the start of the penultimate coil and the end of the outer coil, wherein the pitch continuously increases such that when the angle of expansion of the balance spring has a value of 360 degrees, there is a minimum distance between the penultimate coil and the outer coil to prevent any contact therebetween;
 in the second area, the pitch continuously increases by a constant value;
 the second area includes a first portion whose section is substantially identical to that of the first area, and a second portion, in the extension of the first portion, whose section is increased;
 the strip section is constant between the start of the second portion of the second area and the end of the outer coil;
 the balance spring is silicon-based.

The invention also relates to a resonator wherein the resonator includes a balance cooperating with a balance spring according to any of the preceding variants.

BRIEF DESCRIPTION OF THE DRAWINGS

Other features and advantages will appear clearly from the following description, given by way of non-limiting illustration, with reference to the annexed drawings, in which:

FIG. 4 is a graph showing the change of pitch between the coils as a function of the number of coils of the balance spring at rest.

FIG. 5 is a graph showing the change in thickness of the coils as a function of the number of coils of the balance spring at rest.

FIG. 6 is a graph showing the change in distance between the coils as a function of the number of coils of the balance spring and of the motion of the balance spring.

DETAILED DESCRIPTION OF PREFERRED EMBODIMENTS

The invention relates to a balance spring of reduced dimensions intended to cooperate with a balance to form a sprung-balance type resonator for timepieces.

The development of the present invention was initiated to optimise the number of balance springs on the same silicon-based wafer while ensuring that the coils of each balance spring do not touch each other in either the contracted state or the expanded state. However, it is understood that the balance spring is not limited to a silicon-based material. In a non-limiting manner, it is understood that the same logic is applicable to a balance spring formed using a LIGA method, i.e. from an electrically conductive material or any other material that can be manufactured in a wafer.

The term "silicon-based" means a material including single crystal silicon, doped single crystal silicon, polycrystalline silicon, doped polycrystalline silicon, porous silicon, silicon oxide, quartz, silica, silicon nitride or silicon carbide. Of course, when the silicon-based material is in crystalline phase, any crystalline orientation may be used.

Figure 2:
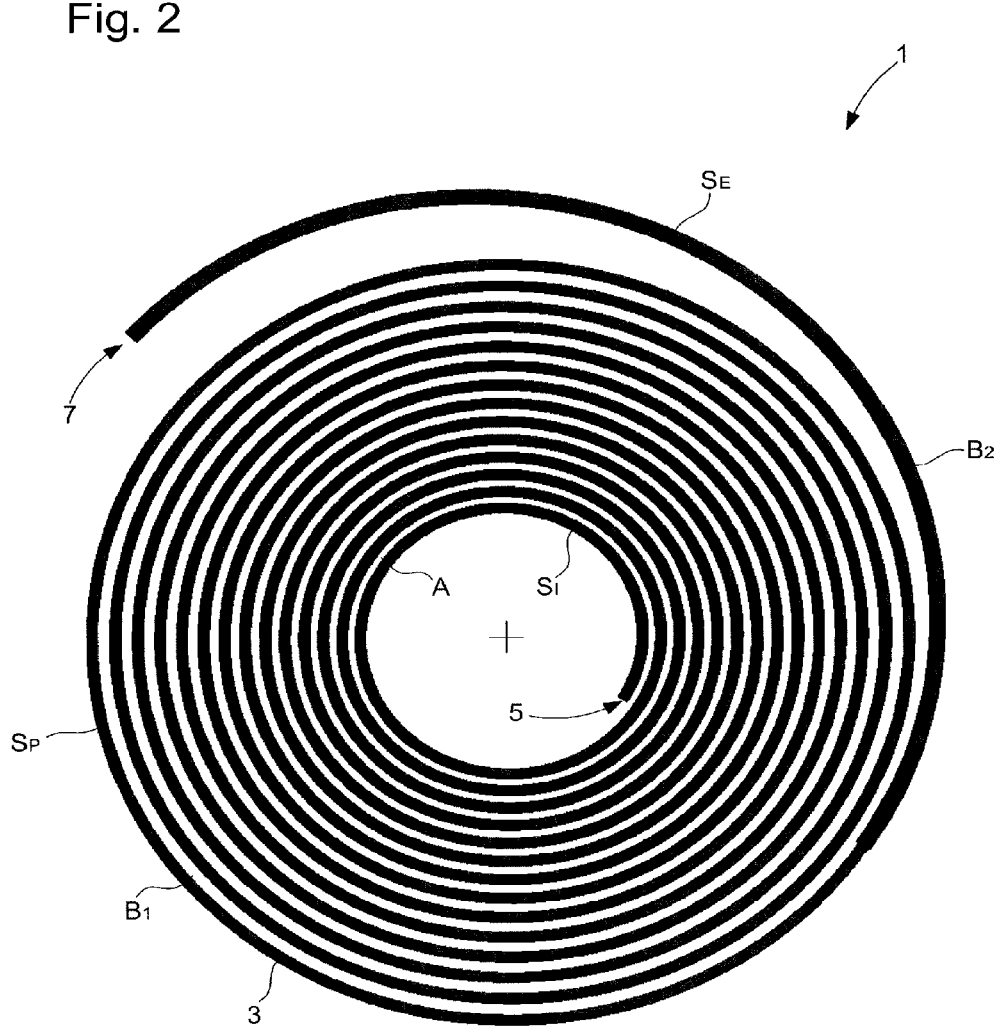
FIG. 2 is a top view of a balance spring according to the invention in the rest position.

As illustrated in FIG. 2, the invention therefore relates to a one-piece balance spring 1 comprising a single strip 3 wound on itself between an inner coil $S_I$ and an outer coil $S_E$. According to the invention, strip 3 of balance spring 1, in its rest position in FIG. 2, comprises between end 5 of inner coil $S_I$ and penultimate coil $S_P$, a first area A wherein the pitch between each coil increases continuously as illustrated in FIG. 4.

Figure 1:
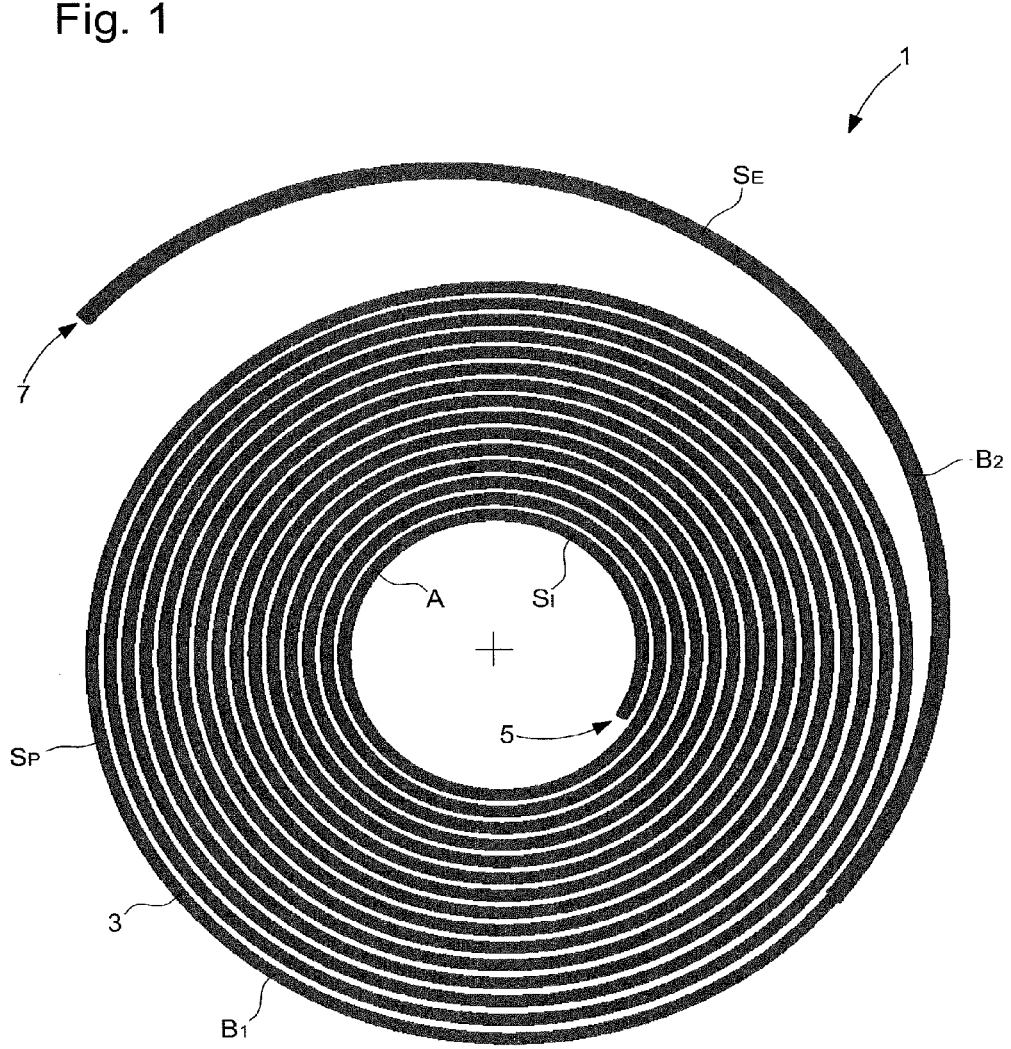
FIG. 1 is a top view of a balance spring according to the invention in the contracted state.

This configuration advantageously means that when balance spring 1 is in the contracted state, i.e. when end 5 of inner coil $S_I$ has effected a rotation of substantially −360° with respect to the centre of balance spring 1, as seen in FIG. 1, there is a substantially constant distance between each coil, from inner coil $S_I$ to penultimate coil $S_P$.

Preferably, as illustrated in FIG. 4, the pitch between each coil increases continuously by a substantially constant value $\Delta V_1$ in first area A. Further, as illustrated in FIG. 5, preferably according to the invention, first area A has a constant section. Thus, for example, the constant section may have a constant thickness $E_1$ comprised between 10 and 50 μm and a constant height comprised between 50 μm and 250 μm.

According to an optional additional feature, advantageously according to the invention, balance spring 1 includes a second area B, in the extension of first area A and comprised between the start of penultimate coil $S_P$ and end 7 of outer coil $S_E$. Second area B has a pitch, between penultimate coil $S_P$ and outer coil $S_E$, which increases continuously as illustrated in FIG. 4.

Figure 3:
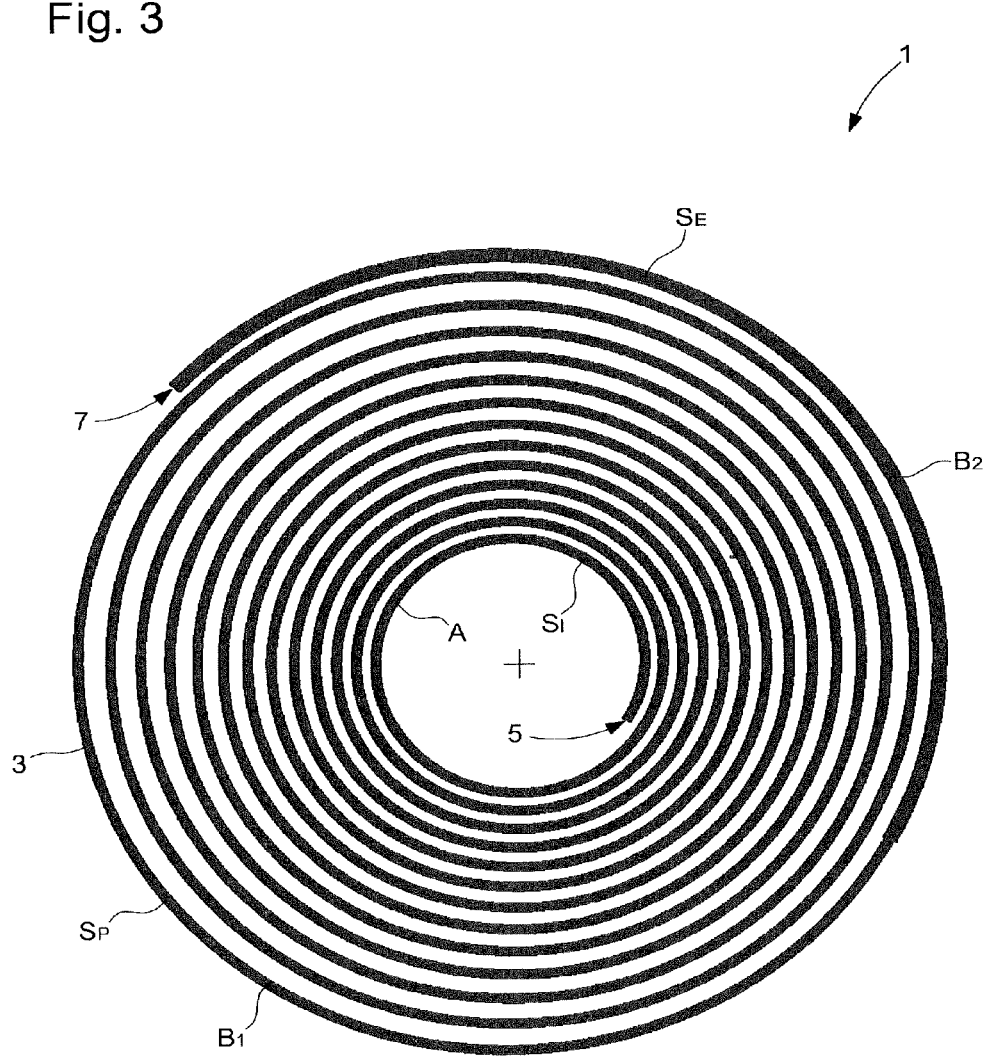
FIG. 3 is a top view of a balance spring according to the invention in an expanded state.

This advantageous configuration means that when balance spring 1 is in the expanded state, i.e. when end 5 of inner coil $S_I$ has effected a rotation of substantially +360 degrees with respect to the centre of balance spring 1, as seen in FIG. 3, there is a minimum distance, i.e. a predefined guaranteed safe distance, between penultimate coil $S_P$ and outer coil $S_E$, to prevent contact particularly between penultimate coil $S_P$ and outer coil $S_E$.

Preferably, as illustrated in FIG. 4, the pitch between each coil increases continuously by a second constant value $\Delta V_2$ in second area B. As seen in FIG. 4, the second constant value $\Delta V_2$ of second area B is preferably greater than the first constant value $\Delta V_1$ of first area A.

Further, as illustrated in FIG. 5, the second area B includes, preferably according to the invention, a first portion $B_1$ with a substantially identical section to that of first area A, then a second portion $B_2$ in which the section is increased. Preferably, as illustrated in FIG. 5, the strip section is constant between the start of second portion $B_2$ of second area B and end 7 of outer coil $S_E$.

Further, the section is preferably increased only by the variation in thickness of strip 3, i.e. with a constant height. Thus, as seen in FIG. 5, the second constant thickness value of second portion $B_2$ of second area B is preferably greater than the first constant thickness value of first area A and of first portion $B_1$ of second area B. Thus, for example, the constant section of second portion $B_2$ of second area B may have a constant thickness comprised between 25 and 75 μm and a constant height comprised between 50 μm and 250 μm.

A first graph representing the change in pitch between the coils as a function of the number of coils of the balance spring at rest is illustrated in FIG. 4. It can be seen that, in first area A of balance spring 1, first area A has a constant increase in pitch by value $\Delta V_1$ to second area B. Second area B has a constant increase in pitch by value $\Delta V_2$ to end 7 of outer coil $S_E$. As seen in FIG. 4, the constant increase $\Delta V_2$ in pitch in second area B is much more pronounced than that $\Delta V_1$ in first area A.

In a complementary manner, a second graph illustrated in FIG. 5, indirectly shows the change in section of strip 3. Indeed, since manufacturing with the aid of a wafer intrinsically entails a substantially constant height, only the change in thickness of the coils according to the number of coils of the balance spring is represented in FIG. 5. It can be seen that first area A of balance spring 1 has a constant section $E_1$ as far as second area B. More precisely, second area B has a first portion $B_1$, whose section remains substantially identical to that $E_1$ of first area A, and a second portion $B_2$, in the extension of first portion $B_1$, whose section is increased.

As seen in FIG. 5, section $E_2$ of strip 3 is substantially constant between the start of second portion $B_2$ of second area B and end 7 of outer coil $S_E$. It can be seen, in particular in the example of FIG. 5, that section $E_2$ of second portion $B_2$ of second area B is almost two times greater than that $E_1$ of first area A and of first portion $B_1$ of second area B.

Finally, a graph showing the change $\Delta P$ in distance between the coils as a function of the number of coils of the balance spring is illustrated in FIG. 6. More specifically, the distance $\Delta P$ between the coils is illustrated for the balance spring in its contracted state in FIG. 1 (curve marked with a square □), in its rest state in FIG. 2 (curve marked with a triangle Δ) and in its expanded state in FIG. 3 (curve marked with a circle ○).

Consequently, in the expanded state marked with a circle (○), it can be seen that, in first area A of balance spring 1, the distance $\Delta P$ between the coils includes a distance $\Delta P$ between the coils that increases continuously until the fixed point of attachment to the stud of end 7 returns the distance between the coils to a minimum value, i.e. a predefined guaranteed safe distance. In the example of FIG. 6, it can be seen that the predefined guaranteed safe distance is approximately 50 μm.

This is logical, since in its rest state, the curve marked with a triangle Δ in FIG. 6 is identical to the curve of FIG. 2. Finally, in the contracted state marked with a square (□), it can be seen that, in first area A of balance spring 1, the distance $\Delta P$ between the coils includes a distance $\Delta P$ between the coils that increases continuously on such a low slope that distance $\Delta P$ can be considered to be substantially constant in first area A. In the example of FIG. 6, it can be seen that distance $\Delta P$ in area A is approximately 35 μm. It is then observed that second area B has a continuous increase, more pronounced than in first area A, in distance $\Delta P$ between the coils towards end 7 of outer coil $S_E$.

In FIG. 6, it is noted that the minimum values of the curves with a circle (○) and a square (□) are not identical. However, they could be made geometrically identical.

Similarly, the values described in FIGS. 4 to 6 are used merely as examples. Depending on the configurations of the balance spring and/or of the resonator to which it belongs, the minimum value chosen could be different from the 35 micrometers chosen as an example in FIG. 6. It is therefore clear that the minimum value of the curves with a circle (○) and a square (□) could each be chosen to be less than or greater than 50 and 35 micrometers respectively.

Advantageously according to the invention, it is understood, however, that these particular features of balance spring 1 allow the spring more compactness at rest while guaranteeing a constant minimum distance between the coils in the contracted state and, possibly, also in the expanded state. The size of the balance spring can therefore be minimised without thereby losing timekeeping properties. With the balance spring of the invention it is possible to optimise the number of balance springs etched on the same wafer in order to reduce the unit cost.

Of course, the present invention is not limited to the illustrated example but is capable of various variants and modifications that will appear to those skilled in the art. In particular, the geometry, i.e. the variations in pitch and section, such as for example the thickness and number of coils, may vary depending on the envisaged applications.

For example, in addition, the number of coils could be reduced to still further decrease the dimensions of the balance spring.

It is also clear that the 360° angle of contraction of or expansion could be smaller without departing from the scope of the invention Indeed, this angle was chosen because, in mechanical terms, the angle cannot theoretically be exceeded in a sprung balance type resonator. However, the important point is not the angle at which the distance is minimum, but rather to ensure that the minimum distance is never exceeded. It is therefore understood that the angle could deliberately be chosen to be lower since, depending on the configuration of the movement, it is clear that this angle will not be exceeded in normal operation.

Further, the ordinate values in FIG. 4 are non-limiting. Thus, depending on the section of first area A, the minimum pitch of first area A and/or the maximum pitch of second area B may vary. It is therefore clear that only the variations in pitch are kept, but not necessarily with the same minimum and/or maximum values.

Similarly, the ordinate values in FIG. 5 are non-limiting. Thus, depending on the section of first area A, the minimum section of first area A and/or the maximum section of second area B may vary. It is therefore clear that only the variations in section are kept, but not necessarily with the same minimum and/or maximum values.

Finally, although the calculations were based on the variation in thickness, it is clear that the variation must be understood as a variation in section, i.e. the variation applies to the height and/or to the thickness of the balance spring strip.

What is claimed is:

1. A one-piece balance spring comprising a single strip wound on itself between an inner coil and an outer coil, the strip at rest having:
   between an end of the inner coil and a penultimate coil, a first area, wherein a pitch between each coil continuously increases such that, when an angle of contraction of the balance spring has a value of 360 degrees, there is a substantially constant distance between each coil from the inner coil to the penultimate coil;
   a second area, in an extension of the first area and comprised between a start of the penultimate coil and an end of the outer coil, wherein the pitch continuously increases such that, when an angle of expansion of the balance spring has a value of 360 degrees, there is a minimum distance between the penultimate coil and the outer coil to prevent any contact therebetween, the second area including a first portion, whose section is substantially identical to that of the first area, and a second portion, in an extension of the first portion, whose section is increased.

2. The balance spring according to claim 1, wherein, in the first area, the pitch between each coil continuously increases by a constant value.

3. The balance spring according to claim 1, wherein the first area has a constant section.

4. The balance spring according to claim 1, wherein, in the second area, the pitch continuously increases by a constant value.

5. The balance spring according to claim 1, wherein a section of the strip is constant between a start of the second portion of the second area and the end of the outer coil.

6. The balance spring according to claim 1, wherein the balance spring is silicon-based.

7. A resonator comprising a balance cooperating with a one-piece balance spring comprising a single strip wound on itself between an inner coil and an outer coil, the strip at rest having:
   between an end of the inner coil and a penultimate coil, a first area, wherein a pitch between each coil continuously increases such that, when an angle of contraction of the balance spring has a value of 360 degrees, there is a substantially constant distance between each coil from the inner coil to the penultimate coil;
   a second area, in an extension of the first area and comprised between a start of the penultimate coil and an end of the outer coil, wherein the pitch continuously increases such that, when an angle of expansion of the balance spring has a value of 360 degrees, there is a minimum distance between the penultimate coil and the outer coil to prevent any contact therebetween, the second area including a first portion, whose section is substantially identical to that of the first area, and a second portion, in an extension of the first portion, whose section is increased.

\* \* \* \* \*